United States Patent
Chen et al.

(10) Patent No.: US 10,914,149 B2
(45) Date of Patent: Feb. 9, 2021

(54) ARTIFICIAL LIFT

(71) Applicant: Upwing Energy, LLC, Cerritos, CA (US)

(72) Inventors: Kuo-Chiang Chen, Kennedale, TX (US); David Biddick, Houston, TX (US); Patrick McMullen, Cerritos, CA (US)

(73) Assignee: Upwing Energy, LLC, Cerritos, CA (US)

( * ) Notice: Subject to any disclaimer, the term of this patent is extended or adjusted under 35 U.S.C. 154(b) by 118 days.

(21) Appl. No.: 16/235,356

(22) Filed: Dec. 28, 2018

(65) Prior Publication Data

US 2020/0072245 A1    Mar. 5, 2020

Related U.S. Application Data

(60) Provisional application No. 62/724,458, filed on Aug. 29, 2018.

(51) Int. Cl.
*E21B 43/12* (2006.01)
*F04D 13/08* (2006.01)
(Continued)

(52) U.S. Cl.
CPC .......... *E21B 43/128* (2013.01); *F04D 13/086* (2013.01); *F04D 13/10* (2013.01); *F04D 29/5806* (2013.01); *F04D 29/588* (2013.01); *H02K 5/132* (2013.01); *H02K 9/16* (2013.01); *F05D 2260/213* (2013.01)

(58) Field of Classification Search
CPC .............................. E21B 47/017; E21B 43/128
See application file for complete search history.

(56) References Cited

U.S. PATENT DOCUMENTS

| | | |
|---|---|---|
| 2,283,118 A | 5/1942 | Armais |
| 4,768,595 A | 9/1988 | Smith |

(Continued)

FOREIGN PATENT DOCUMENTS

| | | |
|---|---|---|
| WO | 2006126886 | 11/2006 |
| WO | 2017021553 | 2/2017 |

OTHER PUBLICATIONS

PCT International Search Report and Written Opinion issued in International Application No. PCT/US2019/043587, dated Oct. 16, 2019, 23 pages.

(Continued)

*Primary Examiner* — Kristyn A Hall
(74) *Attorney, Agent, or Firm* — Fish & Richardson P.C.

(57) ABSTRACT

A stator assembly for a downhole-type well tool includes a stator housing including an internal chamber, an electric stator, a flow channel in the stator housing, and a heat exchanger. The electrical stator is disposed within the stator housing and in contact with the heat exchanger, the electrical stator to drive a rotor. The flow channel in the stator housing includes an inlet and an outlet, and the heat exchanger includes a first heat exchanger portion in contact with the electric stator in the internal chamber and a second heat exchanger portion at least partially disposed in the flow channel. The flow channel flows coolant fluid along the second heat exchanger portion to transmit heat across the heat exchanger from the electric stator to the coolant fluid.

12 Claims, 8 Drawing Sheets

(51) Int. Cl.
  *F04D 13/10*    (2006.01)
  *F04D 29/58*    (2006.01)
  *H02K 5/132*    (2006.01)
  *H02K 9/16*     (2006.01)

(56) References Cited

U.S. PATENT DOCUMENTS

| | | |
|---|---|---|
| 5,620,048 A | 4/1997 | Beauquin |
| 5,988,992 A | 11/1999 | Tetzlaff et al. |
| 6,167,965 B1 | 1/2001 | Bearden et al. |
| 6,557,642 B2 | 5/2003 | Head |
| 6,695,594 B1 | 2/2004 | Pastori |
| 2001/0050173 A1 | 12/2001 | Head |
| 2005/0217859 A1 | 10/2005 | Hartman et al. |
| 2009/0272129 A1 | 11/2009 | Petty |
| 2011/0044831 A1 | 2/2011 | Cunningham et al. |
| 2011/0050173 A1 | 3/2011 | King et al. |
| 2011/0079391 A1 | 4/2011 | Bedouet et al. |
| 2014/0182836 A1* | 7/2014 | Irani .................... E21B 49/081 166/66.4 |
| 2020/0032630 A1 | 1/2020 | Artinian et al. |

OTHER PUBLICATIONS

PCT International Search Report and Written Opinion issued in International Application No. PCT/US2019/048,564, dated Dec. 5, 2019, 16 pages.

* cited by examiner

ARTIFICIAL LIFT

CROSS-REFERENCE TO RELATED APPLICATIONS

This application claims the benefit of priority to U.S. Provisional Patent Application No. 62/724,458, entitled "ARTIFICIAL LIFT," filed Aug. 29, 2018, which is incorporated herein by reference in its entirety.

TECHNICAL FIELD

This disclosure relates to artificial lift systems.

BACKGROUND

Artificial lift equipment, such as electric submersible pumps, compressors, and blowers, can be used in downhole applications to increase fluid flow within a well, thereby extending the life of the well. Such equipment, however, can fail due to a number of factors. Equipment failure can sometimes require workover procedures, which can be costly. On top of this, workover procedures can include shutting in a well in order to perform maintenance on equipment, resulting in lost production. Lost production negatively affects revenue and is therefore typically avoided when possible.

SUMMARY

This disclosure describes artificial lift systems, and cooling stator elements of artificial lift systems.

Some aspects of the disclosure encompass a method for cooling a stator element. The method includes contacting a dielectric fluid in an internal chamber of a stator housing of a device with an electrical stator housed in the stator housing of the device, and with a first heat exchanger portion of a heat exchanger of the stator housing, where the device is to be positioned downhole in a wellbore. The method includes guiding a coolant fluid through a flow channel in the stator housing, where the flow channel includes an inlet and an outlet, directing the coolant fluid with the flow channel across a second heat exchanger portion of the heat exchanger, where the second heat exchanger portion is at least partially disposed in the flow channel, and after directing the coolant fluid across the second heat exchanger portion, further directing the coolant fluid with the flow channel to the outlet of the flow channel.

This, and other aspects, can include one or more of the following features. Guiding a coolant fluid through a flow channel in the stator housing can include flowing, with a communication line connected to the inlet of the flow channel, the coolant fluid from an uphole end of the wellbore to the inlet of the flow channel. The method of claim 2, The outlet of the flow channel can be fluidly connected to an annulus of the wellbore, where the annulus is formed between the stator housing and an inner wall of the wellbore, and where directing the coolant fluid to the outlet of the flow channel can include directing the coolant fluid to the annulus. Guiding a coolant fluid through a flow channel in the stator housing can include flowing the coolant fluid with a circulation pump disposed at least partially within an annulus of the well at a top of the well, the annulus being formed between the stator housing and an inner wall of the wellbore. The outlet of the flow channel can be fluidly connected to a flow bore of the device, the flow bore extending from a first, downhole longitudinal end of the device to a second, uphole longitudinal end of the device opposite the first, downhole end, and directing the coolant fluid to the outlet of the flow channel can include directing the coolant fluid into the flow bore of the device. Directing the coolant fluid to the outlet of the flow channel can include flowing the cooling fluid through the flow channel in a first direction toward the outlet with a control valve disposed within the flow channel. The inlet and the outlet can be fluidly connected to a flow bore of the device, guiding the coolant fluid through the flow channel can include guiding coolant fluid from the flow bore through the flow channel, and directing the coolant fluid to the outlet can include further directing the coolant fluid from the flow channel to the flow bore. Guiding coolant fluid from the flow bore to the flow channel can include guiding the coolant fluid from the flow bore to the inlet proximate a longitudinally downhole end of the stator housing, and directing the coolant fluid from the flow channel to the flow bore can include further directing the coolant fluid to the outlet proximate a longitudinally uphole end of the stator housing. The inlet and the outlet of the flow channel can be fluidly connected to an annulus of the wellbore, the annulus being formed between the stator housing and an interior wall of the wellbore, where guiding the coolant fluid through the flow channel can include guiding the coolant fluid from the annulus through the inlet of the flow channel, and directing the coolant fluid to the outlet of the flow channel can include further directing the coolant fluid to the annulus. Directing the coolant fluid across the second heat exchanger portion of the heat exchanger can include flowing coolant fluid, with a circulation pump disposed at least partially within the flow channel, through the flow channel from the inlet to the outlet.

Some aspects of the disclosure include a well tool to operate downhole in a wellbore, where the well tool includes an electrical stator and a stator housing carrying dielectric fluid in contact with the stator. The stator housing includes an internal chamber, where the dielectric fluid is disposed in the internal chamber, a heat exchanger including a first heat exchanger portion in contact with the dielectric fluid and a second heat exchanger portion. The stator housing also includes a flow channel having an inlet and an outlet, where the second heat exchanger portion is at least partially disposed in the flow channel, and the flow channel flows coolant fluid along the second heat exchanger portion to transmit heat across the heat exchanger from the dielectric fluid to the coolant fluid.

This, and other aspects, can include one or more of the following features. The well tool can include a communication line connected to the inlet of the flow channel and extending from an uphole end of the wellbore to the inlet, the communication line to flow the coolant fluid from the uphole end to the inlet. The outlet of the flow channel can be fluidly connected to an annulus of the wellbore, the annulus to be formed between the stator housing and an inner wall of the wellbore. The outlet of the flow channel can be fluidly connected to a flow bore of the well tool, the flow bore extending from a first, downhole longitudinal end of the well tool to a second, uphole longitudinal end of the well tool opposite the first, downhole end. The flow channel can include a control valve proximate to the outlet of the flow channel, the control valve to selectively control flow direction of the coolant fluid between the outlet and the flow bore of the well tool. The inlet and the outlet can be fluidly connected to a flow bore of the well tool, the flow bore extending from a first, downhole longitudinal end of the well tool to a second, uphole longitudinal end of the well tool opposite the first, downhole end. The inlet of the flow channel can be disposed at a longitudinally downhole end of the stator housing, and the outlet of the flow channel can be disposed at a longitudinally uphole end of the stator housing. The inlet of the flow channel can be fluidly connected to an annulus of the wellbore, where the annulus is formed between the stator housing and an interior wall of the wellbore. The outlet of the flow channel can be fluidly connected to the annulus of the wellbore. The well tool can include a circulation pump disposed at least partially within the flow channel between the inlet and the outlet, where the circulation pump provides flow of the coolant fluid from the inlet toward the outlet. The internal chamber of the stator housing can be hermetically sealed from the flow channel. The coolant fluid can include a brine solution.

Certain aspects of the disclosure include a stator assembly for a downhole-type well tool. The stator assembly includes a stator housing including an internal chamber, an electrical stator disposed within the stator housing and in contact with a heat exchanger, the electrical stator to drive a rotor, a flow channel in the stator housing having an inlet and an outlet, and a heat exchanger having a first heat exchanger portion in contact with the electric stator in the internal chamber and a second heat exchanger portion at least partially disposed in the flow channel. The flow channel flows coolant fluid along the second heat exchanger portion to transmit heat across the heat exchanger from the electric stator to the coolant fluid.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes artificial lift systems, and cooling of electrical components of an artificial lift system. Artificial lift systems installed downhole are often exposed to hostile downhole environments, and failures of the artificial lift systems are often related to failures in the electrical system supporting the artificial lift system. In order to avoid costly workover procedures, it can be beneficial to isolate electrical portions of such artificial lift systems to portions of a well that exhibit less hostile downhole environments in comparison to the producing portions of the well. This disclosure describes artificial lift devices that include a cooling system to cool electrical components, such as an electrical stator. In some implementations, a stator assembly of the artificial lift device circulates a coolant fluid, such as water, brine solution, production fluid, or another coolant fluid type, through a flow channel connected directly or indirectly to an electrical component of the stator. The circulation of fluid through the flow channel can cool electrical components of the stator during operation, for example, to reduce the chance of failure due to overheating.

The subject matter described in this disclosure can be implemented in particular implementations, so as to realize one or more of the following advantages. Use of such artificial lift systems can increase production from wells. In some implementations, the electrical components of the artificial lift system are separated from rotating portions of the artificial lift system, which can improve reliability in comparison to artificial lift systems where electrical systems and electrical components are integrated with both non-rotating and rotating portions. The artificial lift systems described herein can be more reliable than comparable artificial lift systems, resulting in lower total capital costs over the life of a well. The improved reliability can also reduce the frequency of workover procedures, thereby reducing periods of lost production and maintenance costs. The modular characteristic of the artificial systems described herein allows for variability in design and customization to cater to a wide range of operating conditions. The artificial lift systems described herein include a deployable and retrievable string, which can be removed from the well simply and quickly. A replacement retrievable string can then be installed quickly to minimize lost production, thereby reducing replacement costs and reducing lost production over the life of a well.

While issues and risks exist for downhole operations, the potential benefit of well intervention with production-enhancing tools, such as artificial lift tools and other downhole-type tools, is often worth the risk because of the enhanced production it can offer, among other benefits. While these benefits have been demonstrated, reliability, robustness, and operability of equipment in this harsh and remote environment is not close to conventional topside mounted equipment. The concepts described herein improve reliability of downhole-type tools and equipment, for example, by providing electrical components of the downhole tool with a cooling arrangement to cool the electrical components during operation and reduce the risk of overheating. The concepts described herein regard cooling a stator component of an electric machine of a downhole well tool disposed downhole in a wellbore.

Figure 1:
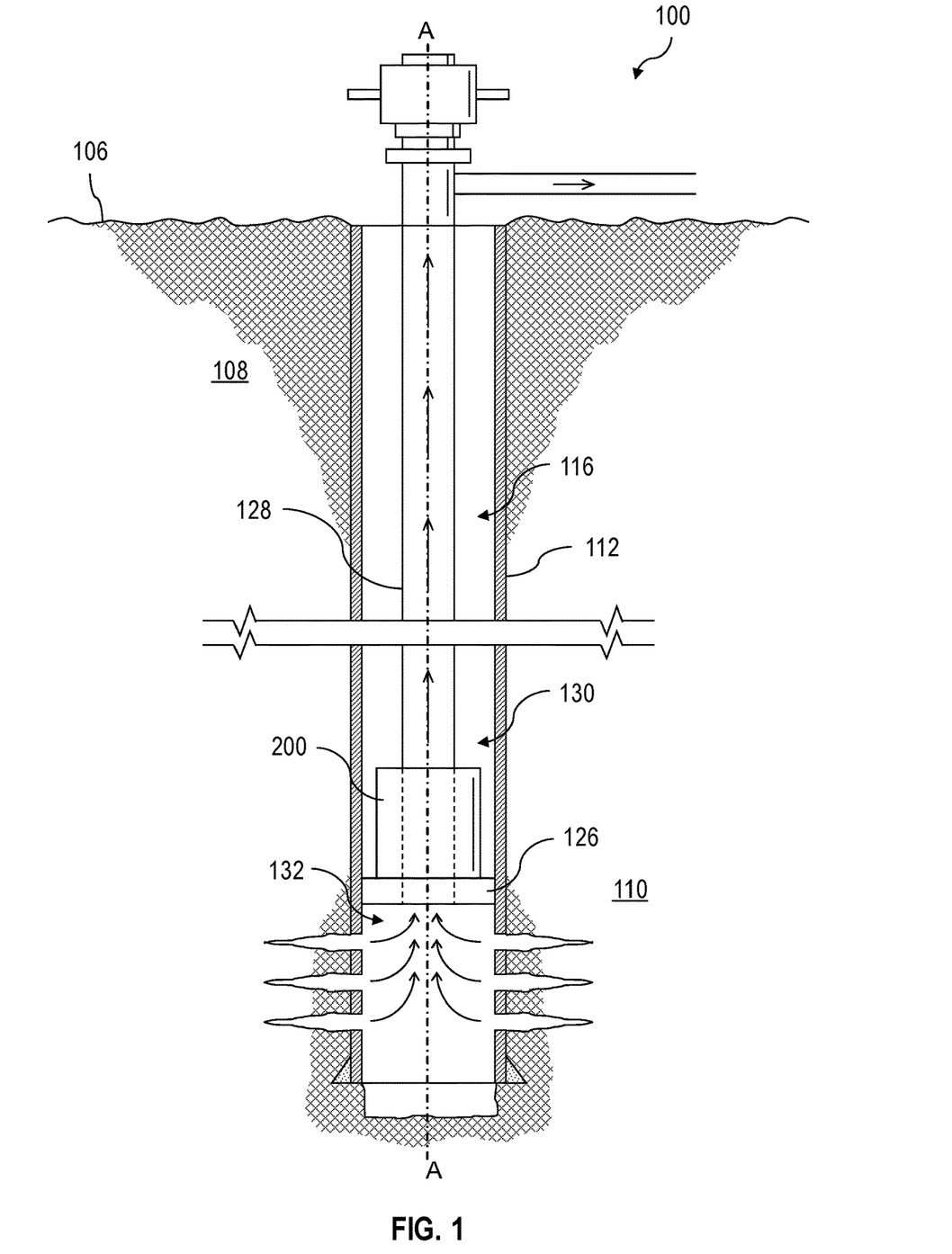
FIG. 1 is a schematic partial cross-sectional side view of an example well.

FIG. 1 is a schematic partial cross-sectional side view of an example well 100 constructed in accordance with the concepts herein. The well 100 extends from the surface 106 through the Earth 108 to one or more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other suitable types of formations, including reservoirs that are not naturally fractured in any significant amount. For simplicity's sake, the well 100 is shown as a vertical well, but in other instances, the well 100 can be a deviated well with a wellbore deviated from vertical (for example, horizontal or slanted) and/or the well 100 can include multiple bores, forming a multilateral well (that is, a well having multiple lateral wells branching off another well or wells).

In some implementations, the well 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In some implementations, the well 100 is an oil well that is used in producing crude oil from the subterranean zones of interest 110 to the surface 106. While termed an "oil well,": the well not need produce only crude oil, and may incidentally or in much smaller quantities, produce gas and/or water. In some implementations, the production from the well 100 can be multiphase in any ratio, and/or can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources, and/or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly and/or otherwise) end-to-end of the same size or of different sizes. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached the wellhead. The Christmas tree includes valves used to regulate flow into or out of the well 100. The well 100 also includes an artificial lift system 200 residing in the wellbore, for example, at a depth that is nearer to subterranean zone 110 than the surface 106. The artificial lift system 200, being of a type configured in size and robust construction for installation within a well 100, can include any type of rotating equipment that can assist production of fluids to the surface 106 and out of the well 100, for example, by creating an additional pressure differential within the well 100. For example, the system 200 can include a pump (e.g., electric submersible pump, or ESP), compressor, blower, or multiphase fluid flow aid. In the present disclosure, while many of the concepts herein are discussed with respect to an ESP, they are likewise applicable to other types of pumps, compressors, blowers and devices for moving multi-phase fluid.

Casing 112 is commercially produced in a number of common sizes specified by the American Petroleum Institute (the "API"), including 4½, 5, 5½, 6, 6⅝, 7, 7⅝, $^{16}$⁄₈, 9⅝, 10¾, 11¾, 13⅜, 16, 116/8 and 20 inches, and the API specifies internal diameters for each casing size. The system 200 can be configured to fit in, and (as discussed in more detail below) in certain instances, seal to the inner diameter of one of the specified API casing sizes. Of course, the system 200 can be made to fit in and, in certain instances, seal to other sizes of casing or tubing or otherwise seal to a wall of the well 100.

Additionally, the construction of the components of the system 200 are configured to withstand the impacts, scraping, and other physical challenges the system 200 will encounter while being passed hundreds of feet/meters or even multiple miles/kilometers into and out of the well 100. For example, the system 200 can be disposed in the well 100 at a depth of up to 20,000 feet (6,096 meters). Beyond just a rugged exterior, this encompasses having certain portions of any electrical components being ruggedized to be shock resistant and remain fluid tight during such physical challenges and during operation. Additionally, the system 200 is configured to withstand and operate for extended periods of time (e.g., multiple weeks, months or years) at the pressures and temperatures experienced in the well 100, which temperatures can exceed 400° F./205° C. and pressures over 2,000 pounds per square inch, and while submerged in the well fluids (gas, water, or oil as examples). Finally, the system 200 can be configured to interface with one or more of the common deployment systems, such as jointed tubing (that is, lengths of tubing joined end-to-end, threadedly and/or otherwise), sucker rod, coiled tubing (that is, not-jointed tubing, but rather a continuous, unbroken and flexible tubing formed as a single piece of material), slickline (that is, a single stranded wire), or wireline with an electrical conductor (that is, a monofilament or multifilament wire rope with one or more electrical conductors, sometimes called e-line) and thus have a corresponding connector (for example, a jointed tubing connector, coiled tubing connector, or wireline connector). Some components of the system 200 (such as non-rotating parts and electrical systems, assemblies, and components) can be part of or attached to the production tubing 128 to form a portion of the permanent completion or well completion, while other components (such as rotating parts) can be deployed within the production tubing 128.

A seal system 126 integrated into or provided separately with a downhole system, as shown with the system 200, divides the well 100 into an uphole zone 130 above the seal system 126 and a downhole zone 132 below the seal system 126. FIG. 1 shows the system 200 positioned in the open volume of the bore 116 of the casing 112, and connected to a production string of tubing (also referred as production tubing 128) in the well 100. The wall of the well 100 includes the interior wall of the casing 112 in portions of the wellbore having the casing 112, and includes the open hole wellbore wall in uncased portions of the well 100. Thus, the seal system 126 is configured to seal against the wall of the wellbore, for example, against the interior wall of the casing 112 in the cased portions of the well 100 or against the interior wall of the wellbore in the uncased, open hole portions of the well 100. In certain instances, the seal system 126 can form a gas-tight and liquid-tight seal at the pressure differential the system 200 creates in the well 100. For example, the seal system 126 can be configured to at least partially seal against an interior wall of the wellbore to separate (completely or substantially) a pressure in the well 100 downhole of the seal system 126 from a pressure in the well 100 uphole of the seal system 126. For example, the seal system 126 includes a production packer. Although not shown in FIG. 1, additional components, such as a surface pump, can be used in conjunction with the system 200 to boost pressure in the well 100.

In some implementations, the system 200 can be implemented to alter characteristics of a wellbore by a mechanical intervention at the source. Alternatively, or in addition to any of the other implementations described in this specification, the system 200 can be implemented as a high flow, low pressure rotary device for gas flow in sub-atmospheric wells. Alternatively, or in addition to any of the other implementations described in this specification, the system 200 can be implemented in a direct well-casing deployment for production through the wellbore. Other implementations of the system 200 as a pump, compressor, or multiphase combination of these can be utilized in conjunction with additional pumps, compressors, or multiphase combinations of these in the well bore to effect increased well production.

The system 200 locally alters the pressure, temperature, and/or flow rate conditions of the fluid in the well 100 proximate the system 200. In certain instances, the alteration performed by the system 200 can optimize or help in optimizing fluid flow through the well 100. As described previously, the system 200 creates a pressure differential within the well 100, for example, particularly within the locale in which the system 200 resides. In some instances, a pressure at the base of the well 100 is a low pressure (for example, sub-atmospheric); so unassisted fluid flow in the wellbore can be slow or stagnant. In these and other instances, the system 200 introduced to the well 100 adjacent the perforations can reduce the pressure in the well 100 near the perforations to induce greater fluid flow from the subterranean zone 110, increase a temperature of the fluid entering the system 200 to reduce condensation from limiting production, and/or increase a pressure in the well 100 uphole of the system 200 to increase fluid flow to the surface 106.

The system 200 moves the fluid at a first pressure downhole of the system 200 to a second, higher pressure uphole of the system 200. The system 200 can operate at and maintain a pressure ratio across the system 200 between the second, higher uphole pressure and the first, downhole pressure in the wellbore. The pressure ratio of the second pressure to the first pressure can also vary, for example, based on an operating speed of the system 200.

The system 200 can operate in a variety of downhole conditions of the well 100. For example, the initial pressure within the well 100 can vary based on the type of well, depth of the well 100, production flow from the perforations into the well 100, and/or other factors. In some examples, the pressure in the well 100 proximate a bottomhole location is sub-atmospheric, where the pressure in the well 100 is at or below about 14.7 pounds per square inch absolute (psia), or about 101.3 kiloPascal (kPa). The system 200 can operate in sub-atmospheric well pressures, for example, at well pressure between 2 psia (13.8 kPa) and 14.7 psia (101.3 kPa). In some examples, the pressure in the well 100 proximate a bottomhole location is much higher than atmospheric, where the pressure in the well 100 is above about 14.7 pounds per square inch absolute (psia), or about 101.3 kiloPascal (kPa). The system 200 can operate in above atmospheric well pressures, for example, at well pressure between 14.7 psia (101.3 kPa) and 5,000 psia (34,474 kPa).

As described earlier, the example system 200 can take a variety of forms, such as a pump, compressor, blower, multiphase fluid flow aid, or other artificial lift tool. In some instances, the system 200 can be coupled to the casing 112, coupled to the production tubing 128, retrievable from the wellbore 102 such as by a wireline, slickline, or other retrievable string, or can be modular such that a first portion of the system 200 is coupled to a well completion of the well and a second portion of the system 200 is retrievably disposed adjacent to the first portion. For example, the artificial lift system 200 can include a modular electric submersible pump, where a non-rotating stator portion couples to the well completion (e.g., to the production tubing 128), and a rotatable rotor portion is connected to a retrievable string that can deploy, position, and retrieve the rotatable rotor portion in the well relative to the stator portion.

Figure 2:
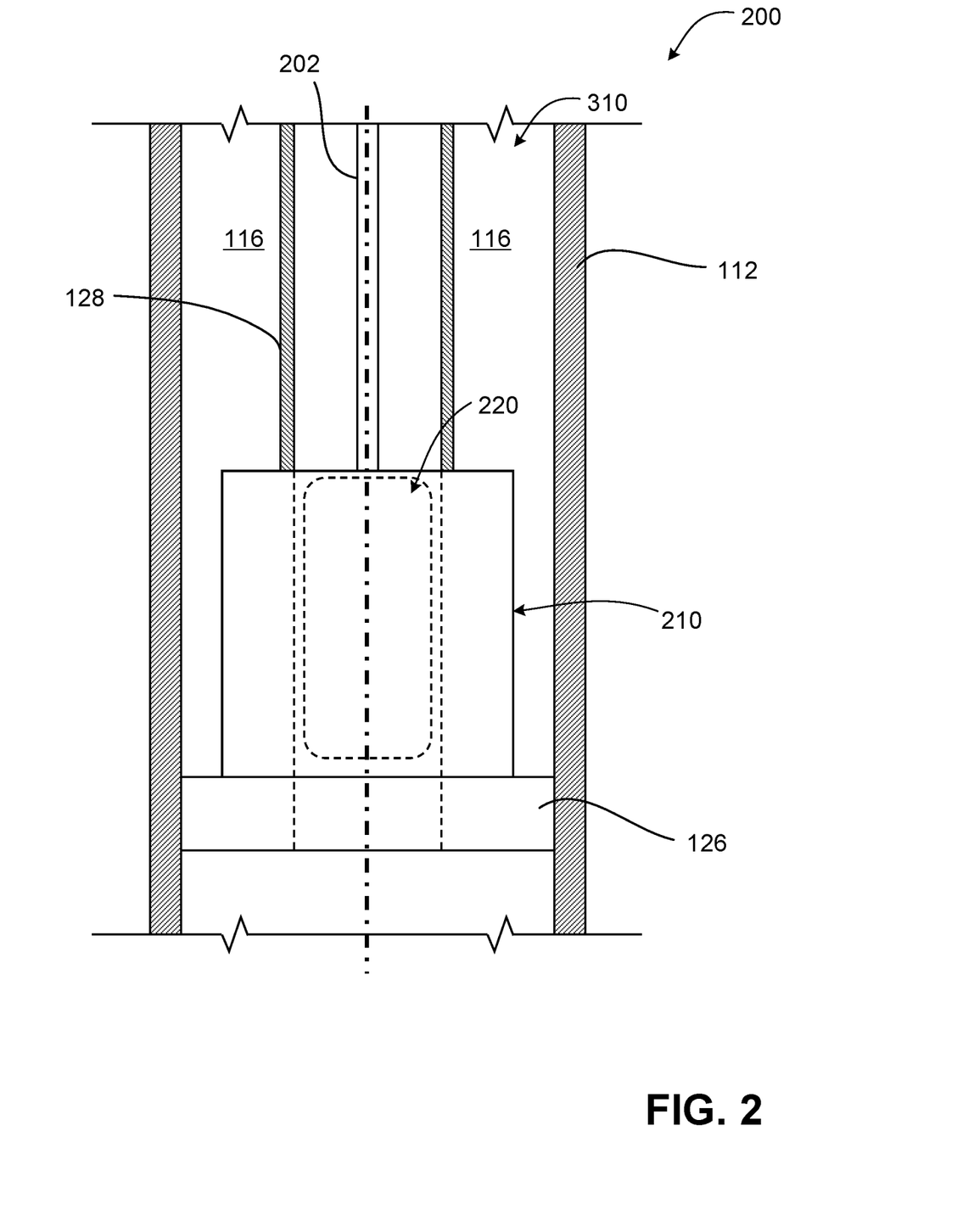
FIG. 2 is a schematic partial cross-sectional side view of an example system within the well of FIG. 1.
Figure 3:
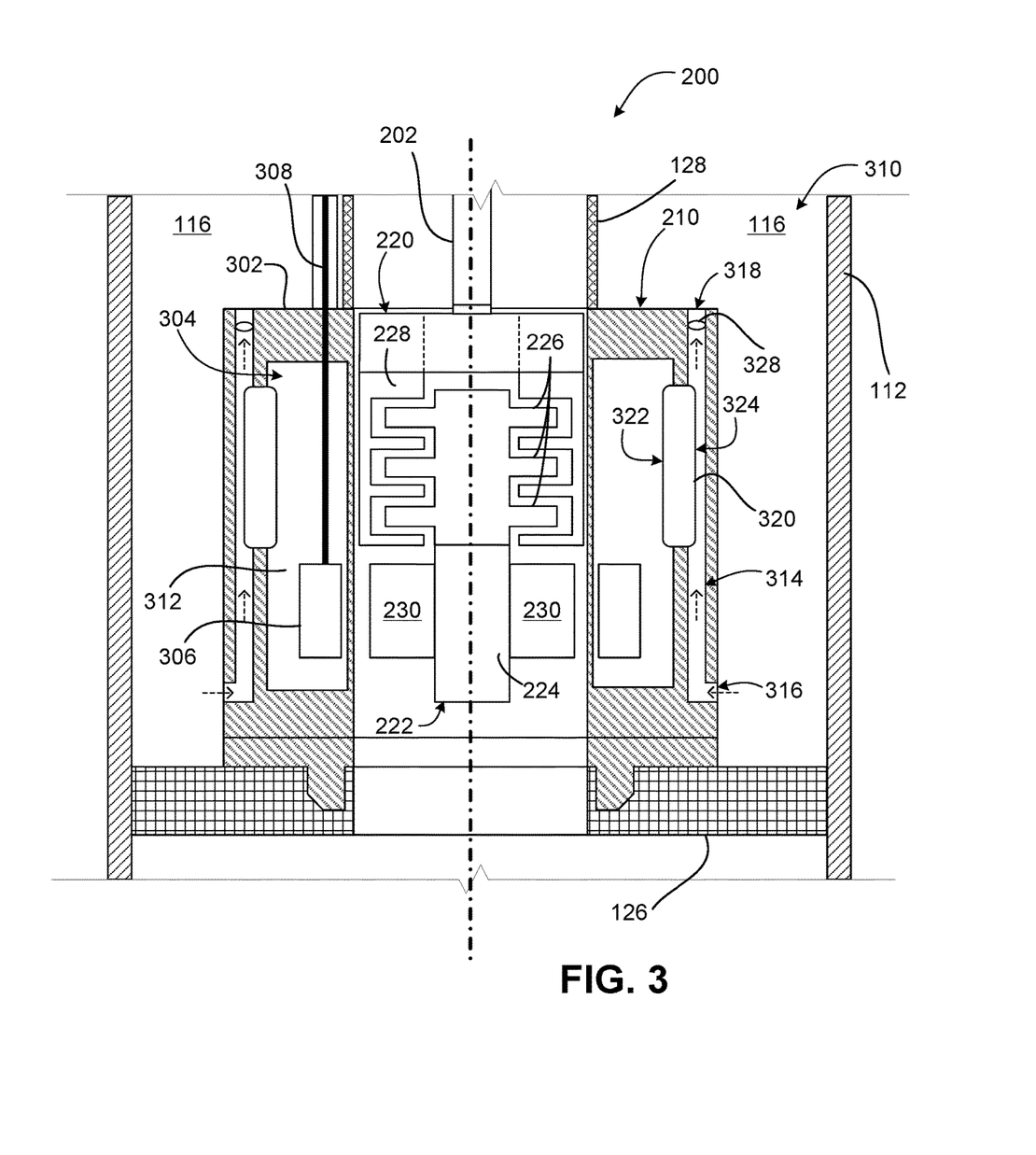
FIG. 3 is a schematic partial cross-sectional side view of the example system in the well of FIG. 2.

FIG. 2 is a schematic partial cross-sectional side view of the example system 200 in the well 100 of FIG. 1, where the example system 200 forms a modular ESP. The example system 200 includes a subsystem 210 and a retrievable string 220, where the subsystem 210 includes a stator and the retrievable string 220 includes a rotor. The rotor of the retrievable string 220 is configured to rotate relative to the stator of the subsystem 210, described in more detail later. FIG. 3 is another partial cross-sectional side view of the example system 200 of FIG. 2, including the example subsystem 210 and the example retrievable string 220, showing a closer view of the example system 200.

Referring to both FIGS. 2 and 3, the subsystem 210 can be installed as a portion of a completion string of the well 100. In some instances, the subsystem 210 is referred to as the well completion (or as part of the well completion) in this disclosure. In some implementations, the subsystem 210 (in part or in whole) is part of the casing 112 and can be cemented in place within the well 100. The subsystem 210 can be connected to the seal system 126 (for example, a production packer) to form a part of the completion string of the well 100. Similarly, the subsystem 210 can be connected to and/or include part of the production tubing 128 to form part of the completion string of the well 100. The retrievable string 220 can be configured to interface with one or more of the common deployment systems described previously (for example, slickline), such that the retrievable string 220 can be deployed downhole into the well 100 and retrieved from the well 100. For example, a cable 202 in the form of a slickline is shown as connected to the retrievable string 220. However, the cable 202 can take a variety of other forms, such as a slickline, wireline, e-line, coil tubing, sucker rod, a combination of these, or other deployment cable. At least a portion of the retrievable string 220 can be positioned within the subsystem 210. In some implementations, the entire retrievable string 220 can be positioned within the subsystem 210.

The subsystem 210 and the retrievable string 220 can include corresponding coupling parts (not shown) that are cooperatively configured to couple the retrievable string 220 and the subsystem 210 to each other. Coupling the corresponding coupling parts can secure the relative positions of the subsystem 210 and the retrievable string 220 to each other. The subsystem 210 and the retrievable string 220 are detachably coupled to each other via the corresponding coupling parts, that is, the subsystem 210 and the retrievable string 220 can be subsequently decoupled and detached from each other.

Referring to FIG. 3, the subsystem 210 includes a stator housing 302, an internal chamber 304 of the stator housing 302, and a stator 306 disposed within the internal chamber 304. The stator housing 302 is shown in FIG. 3 as substantially cylindrical, though the shape of the stator housing 302 can vary. The stator 306 is an electrical stator, in that it includes an electromagnetic coil(s). The retrievable string 220 includes a rotor 222. While the retrievable string 220 is coupled to the subsystem 210, the stator 306 is configured to drive rotation of the rotor 222 in response to receiving power (for example, power supplied via an electrical line from a surface location). The concepts herein likewise apply to a generator, where the rotor 222 is spun and generates electricity in coils of the stator 306. The rotor 222 includes a central rotating shaft 224 and impellers 226, along with a non-rotating rotor housing 228. The rotor 222 includes a motor permanent magnet 230 coupled to or integral with the rotor 222, and the motor permanent magnet 230 is configured to interact magnetically with the electromagnetic coil of the stator 306. Rotation of the rotor 222 rotates the impellers 226. When the rotor 222 rotation is driven by the stator 306, the impellers 226 act as a fluid pump to drive fluid through the central bore, for example, uphole through the central bore. Fluid flow in the central bore can, in some instances, drive the impellers 226 to rotate, and the rotor 222 acts as a generator when the permanent magnet 230 interacts magnetically with the stator 306. In some implementations, the rotor 222 is free of electrical components. In some implementations, the subsystem 210 is free of rotating components.

FIG. 3 shows the retrievable string 220 as disposed such that the pump (e.g., impellers 226) is positioned uphole of the permanent magnet 230. However, this position and orientation can vary. For example, the permanent magnet 230 can be positioned uphole of the pump (impellers 226) on the rotor 222. In other words, the pump, and the fluid inlet of the pump (e.g., at the impellers 226), can be positioned uphole of or downhole of the permanent magnet(s) 230 along the longitudinal length of the rotor.

The system 200 can be exposed to production fluid from the subterranean zone 110. For example, production fluid downhole of the seal system 126 can flow uphole through a central flow bore of the system 200, and a controlled completion fluid, such as a brine solution, can be disposed in the annulus 310 uphole of the seal system 126 and between the production tubing 128 and the casing 112. The annulus 310 can extend to the surface (e.g., surface 106) of the well 100, where the completion fluid is controlled (e.g., monitored, pressurized, recycled, or otherwise controlled) at the surface. In some instances, the seal system 126 is excluded, and the system 200 is disposed on the production tubing 128, cable 202, or both, without the presence of a seal system 126. Absence of the seal system 126 can mean that the annulus 310 includes production fluid.

The rotation of the rotor 222 can induce fluid flow in the well 100 (for example, from the subterranean zone 110 to the surface 106). In some implementations, the system 200 can allow production fluid from the subterranean zone 110 to flow over an outer surface of the rotor 222. In some implementations, production fluid from the subterranean zone 110 flows through the annulus between the rotor 222 and the stator housing 302. In some implementations, production fluid from the subterranean zone 110 can flow through an inner bore of the rotor 222.

The stator housing 302 can attach to a tubing of the well 100 (for example, the production tubing 128). The stator housing 302 has an inner surface defined by an inner diameter that forms the central flow bore of the system 200. The stator housing 302 can be metallic or non-metallic, and can be made of a material suitable for the environment and operating conditions (for example, downhole conditions). In some implementations, the stator housing 302 includes a protective sleeve to protect the stator housing 302 from production fluid, while also allowing magnetic flux to penetrate from the stator 306, through the stator housing 302 and protective sleeve, and into the inner bore of the stator housing 302, for example, to interact with the permanent magnet 230 of the rotor 222. The protective sleeve can be a part of (that is, integral to) the production tubing 128 or can be attached to the production tubing 128. The stator housing 302 and/or the protective sleeve can be made of, for example, carbon fiber or Inconel.

The stator 306 is an electrical stator, and includes the electromagnetic coil to interact with the rotor 222, for example, the permanent magnet 230 of the rotor 222. In response to receiving power, the electromagnetic coil of the stator can generate a magnetic field to engage the motor permanent magnet 230 of the rotor 222 and cause the rotor 222 to rotate. The electromagnetic coil and the motor permanent magnet 230 interact magnetically. The electromagnetic coil and the motor permanent magnet 230 each generate magnetic fields, which attract or repel each other. The attraction or repulsion imparts forces that cause the rotor 222 to rotate. The stator 306 and the rotor 222 can be designed such that corresponding components are located near each other, for example, when the retrievable string 220 is positioned within and coupled to the subsystem 210. For example, the electromagnetic coil of the stator 306 is in the vicinity of the motor permanent magnet 230 of the rotor 222. In some examples, the electromagnetic coil can be constructed similar to a permanent magnet motor stator, including laminations with slots filled with coil sets constructed to form three phases with which a produced magnetic field can be sequentially altered to react against a motor permanent magnetic field and impart torque on a motor permanent magnet, thereby causing the rotor 222 to rotate.

The stator 306 includes an electrical connection 308 to provide an electrical supply to the electromagnetic coil(s) of the stator 306. In FIG. 3, the electrical connection 308 includes a cable coupled to the stator 306 and extending from the stator 306 out of the stator housing 302 and extending uphole in the annulus 310 of the well. The annulus 310, for example, is formed in the annular space 116 between the casing 112 and the production tubing 128. The annulus 310 can be filled with completion fluid, such as an annulus brine solution, and can include a corrosion inhibitor in order to provide protection against corrosion of the electrical connection 308. The cable of the electrical connection 308 can be disposed in a sleeve or channel, for example, to separate the cable from the annulus brine solution or other potentially caustic fluids present downhole. The electrical connection 308 can be connected to a power source located within the wellbore of the well 100 or at the surface 106 via the cable to supply power to the electromagnetic coil and/or other electrical components of the stator 306. The electrical connection 308 can be can be configured to prevent fluid from entering and exiting stator 306 or the internal chamber 304 through the electrical connection 308. The electrical connection 308 can be used to supply power and/or transfer information. Although shown as having one electrical connection 308, the system 200 can include additional electrical connections.

The subsystem 210 includes a cooling system configured to cool, or remove heat from, the electrical components of the stator 306 during operation of the stator 306. The cooling system provides and directs fluid to the stator housing 302 to cool, directly or indirectly, the electrical components of the stator 306. In the example system 200 of FIG. 3, the subsystem 210 includes a dielectric fluid 312 (or other dielectric material) in the internal chamber 304 of the stator housing 302. The internal chamber 304 is potted or flooded with the dielectric fluid 312, and the stator disposed at least partially within the internal chamber 304, so that the dielectric fluid 312 is in contact with the stator 306 and can conduct heat from the stator 306. The stator housing 302 also includes a flow channel 314 through the stator housing 302, where the flow channel 314 includes an inlet 316 and an outlet 318 at a peripheral surface of the stator housing 302, and a heat exchanger 320 between the flow channel 314 and the internal chamber 304. The inlet 316 and the outlet 318 are openings in the surface (e.g., peripheral surface) of the stator housing 302 to allow fluid access to the flow channel 314. The flow channel 314 allows coolant fluid to flow along the flow channel 314 from the inlet 316 to the outlet 318 and along (or across a portion of) the heat exchanger. The flow channel 314 can provide continuous flow of coolant fluid (or other fluid) across the heat exchanger 320 during operation of the stator 306, for example, to cool the stator by transferring heat from the stator to the coolant fluid flowing through the flow channel 314. The heat exchanger 320 includes a first heat exchanger portion 322 disposed (at least partly) in the internal chamber 304 in contact with the dielectric fluid 312, and a second heat exchanger portion 324 disposed (at least partly) in the flow channel 314. The first heat exchanger portion 322 includes a surface in contact with the dielectric fluid 312, and the surface of the first heat exchanger portion 322 can form part of an inner wall of the internal chamber 304. The second heat exchanger portion 324 includes a surface in contact with the fluid in the flow channel 314, and the surface of the second heat exchanger portion 324 can form part of an inner wall of the flow channel 314. The combination of the dielectric fluid 312, the heat exchanger 320, and the flow channel 314 form the cooling system of the system 200.

The dielectric fluid 312 in the internal chamber 304 conducts heat from hot sections of the stator 306 and dissipates the heat throughout the dielectric fluid 312. The dielectric fluid 312 is cooled at the heat exchanger, where the heat exchanger 320 transmits heat between the dielectric fluid 312 and the coolant fluid in the flow channel 314. For example, the heat exchanger 320 can transfer excess heat across the heat exchanger 320 from the dielectric fluid 312 in contact with the stator 306 to the coolant fluid flowing through the flow channel 314, for example, to cool the stator 306 during operation. The flow of fluid through the flow channel 314 can lower the operating temperature of the stator 306 (which can help to extend the operating life of the system 200), particularly when the surrounding temperature of the environment would otherwise prevent the system 200 from meeting its intended operating life. Some non-limiting examples of components that can benefit from cooling by the cooling system are the electromagnetic coil of the stator 306, and any other electrical components of the stator 306.

In some implementations, the heat exchanger 320 directly contacts the stator 306 to conduct heat from the hot sections of the stator 306. For example, the first heat exchanger portion 322 can directly contact the stator 306. The subsystem 210 can exclude the dielectric fluid 312 in the internal chamber 304, for example, in instances where the heat exchanger contacts the electrical stator 306 to conduct heat directly from the hot sections of the stator 306.

The internal chamber 304 can be hermetically sealed, for example, to enclose the dielectric fluid 312 in the internal chamber 304. The internal chamber 304 is separate from the flow channel 314, and the heat transfer between the dielectric fluid 312 of the internal chamber 304 to the coolant fluid in the flow channel 314 occurs substantially or entirely over the heat exchanger 320. The heat exchanger 320 provides enough contact areas between the heat source (e.g., the stator 306 and/or dielectric fluid 312) and the coolant fluid in the flow channel 314 so that the heat can be effectively taken away from heat sources. In some implementations, the number of flow channels 314, the length of the flow channel (s) 314, and the cross-sectional area (e.g., circular cross-section) of the flow channel(s) 314 are optimized for a desired, or maximum, heat transfer at the heat exchanger 320. For example, the number, length, and cross-sectional area of the flow channel(s) 314 can be optimized to maximize surface area of the flow channel 314 at the heat exchanger 320. In some examples, the stator housing 302 includes a network of multiple flow channels 314, the total length of the flow channels 314 are routed around the inner diameter, outer diameter, and longitudinal ends of the stator housing 302 to increase the length of the flow channel 314, the cross-sectional area (e.g., circular, oval, or other) of the flow channel 314 is adjusted to increase the effective diameter of the flow channel 314, or a combination of these features are implemented to optimize the heat transfer from the stator 306 to the coolant in the flow channel(s) 314.

While FIG. 3 shows the heat exchanger 320 as coupled to the stator housing 302, the heat exchanger 320 can be integral with, or formed in, the stator housing 302. For example, the flow channel 314 can be formed in the stator housing 302, and the heat exchanger 320 can be defined as the portion of the stator housing 302 between the internal chamber 304 and the flow channel 314. In some examples, the flow channel 314 forms an undulating flow path through the stator housing 302 proximate to (but not in contact with) the internal chamber 304, such that the portions of the stator housing 302 directly between the flow channel 314 and the internal chamber 304 form the heat exchanger 320 of the system 200. In certain instances, the flow channel 314 can be formed in the stator housing 302 with direct contact to the stator 306. In some implementations, the heat exchanger 320 includes a heat sink, and fins of the heat sink are disposed in the flow channel 314 to contact coolant fluid flowing through the flow channel 314. The heat sink can be constructed of a metal or non-metal, such as plastic or ceramic, that can provide adequate heat conduction to flow heat generated in the stator 306 to the fluid. The heat exchanger 320 can be shorter or longer than the stator 306, for example, depending on the amount of heat to be transferred to the fluid.

The coolant fluid configured to flow through the flow channel 314 can take a variety of forms, for example, depending on what the inlet 316 and the outlet 318 are fluidly connected to, or where the system is disposed in a well. For example, the coolant fluid can include water, brine solution, formation fluid or production fluid, or other fluids, as described in greater detail later.

While the example subsystem 210 of FIG. 3 shows the inlet 316 positioned proximate to a downhole end of the housing 302 and the outlet 318 positioned proximate to an uphole end of the housing 302, the locations of the inlet 316 and the outlet 318 can be different. For example, the inlet of 316 of the flow channel 314 can be positioned elsewhere on the periphery of the housing 302, such as proximate to the uphole end, the downhole end, or an intermediate location between the uphole end and the downhole end of the housing 302. Likewise, the outlet 318 of the flow channel 314 can be positioned elsewhere on the periphery of the housing 302, such as proximate to the uphole end, the downhole end, or an intermediate location between the uphole end and the downhole end of the housing 302. The inlet 316 and the outlet 318 can be positioned separate from or adjacent to (but fluidly separate from) each other, where the flow channel 314 extends through the housing 302 in any desired path that extends at least partially along the heat exchanger 320. As described later, the locations of the inlet 316 and the outlet 318 can vary based on the type of fluid intended to flow through the flow channel 314, a pressure differential in the annulus 310 and/or the central bore, an orientation of the components of the retrievable string 220, a combination of these factors, or other factors.

In the example system 200 of FIG. 3, the inlet 316 and the outlet 318 of the flow channel 314 are fluidly connected to the annulus 310 of the wellbore. The flow channel 314 flows fluid disposed in the annulus 310, such as annular brine solution, from the inlet 316 to the outlet 318 to flow across the second portion 324 of the heat exchanger 320, where the heat exchanger 320 dissipates heat to the fluid flowing through the flow channel 314. The flow channel 314 circulates the brine solution between the stator housing 302 and the annulus, and the well casing wall 112 can absorb, and remove, heat from the brine solution in the annulus 310. In some implementations, the subsystem 210 includes a circulation pump (not shown) disposed at least partially within the flow channel 314 to bias fluid flow through the flow channel 314 from the inlet 316 to the outlet 318. The circulation pump can be mounted on the stator housing 302, and forces flow of fluid along the flow channel 314 to induce heat exchange at the heat exchanger 320. In some implementations, the flow channel 314 includes a control valve 328 to selectively control the direction and flow of fluid through the flow channel 314. The control valve 328 can be positioned proximate to the outlet 318 of the flow channel 314, and in some examples, can include a one-way check valve. The one-way check valve allows fluid to flow in a first direction along the flow channel 314 from the inlet 316 to the outlet 318, but restricts or limits flow in a second direction, opposite the first direction, from the outlet 318 to the inlet 316.

In some instances, a recirculation pump (not shown) can pull cool fluid from an uphole end of the annulus 310 to the subsystem 210, for example, proximate to the inlet 316 of the flow channel 314. The recirculation pump can be disposed at least partially in the annulus 310, and can be part of or separate from the system 200. In some instances, a surface cooling system at a surface of the well 100 can be fluidly coupled to the annulus 310 and can cool the fluid in the annulus 310. As heat is dissipated into the annulus fluid during operation of the stator 306 and the flow of fluid through the flow channel 314 and into the annulus 310, fluid in the annulus 310 is circulated through the surface cooling system at the surface of the well 100 such that some heat is at least partially removed from the fluid in the annulus 310 with the surface cooling system. The surface cooling system can include a pump and a heat exchanger, or other means for removing heat from the annulus fluid.

In the example system 200 of FIG. 3, both the inlet 316 and the outlet 318 of the flow channel 314 are fluidly connected to the annulus 310 to circulate annular brine solution through the flow channel 314. However, the inlet 316, the outlet 318, or both the inlet 316 and the outlet 318, can be fluidly connected to other portions of the system 200 or of the well 100. For example, the inlet 316 of the flow channel can fluidly connect to the annulus 310, to the central flow bore of the subsystem 210 to flow production fluid through the flow channel 314, to a communication line or tubing fluidly connected to a remote fluid supply (e.g., at a surface of the well), or a combination of these. Similarly, the outlet 318 of the flow channel 314 can fluidly connect to the annulus 310, to the central flow bore of the subsystem to flow production fluid from the flow channel 314 to the central flow bore, to a communication line or tubing to flow fluid from the flow channel 314 to a remote location, or a combination of these. In certain implementations, the system 200 excludes the seal system 126, and the inlet 316 and outlet 318 fluidly connected to the annulus 310 are configured to flow formation fluid present in the annulus 310 (i.e., the bore 116) through the flow channel 314. In some examples, the flow channel 314 flows annular fluid disposed locally downhole in the annulus 310 (e.g., the brine solution in the annulus 310), flows production fluid disposed locally downhole in the central bore of the system 200 (e.g., the production fluid flowing uphole through the system 200), or flows a coolant fluid provided by a communication line fluidly coupled to the inlet 316 from a remote location, such as the surface of the well.

Figure 4:
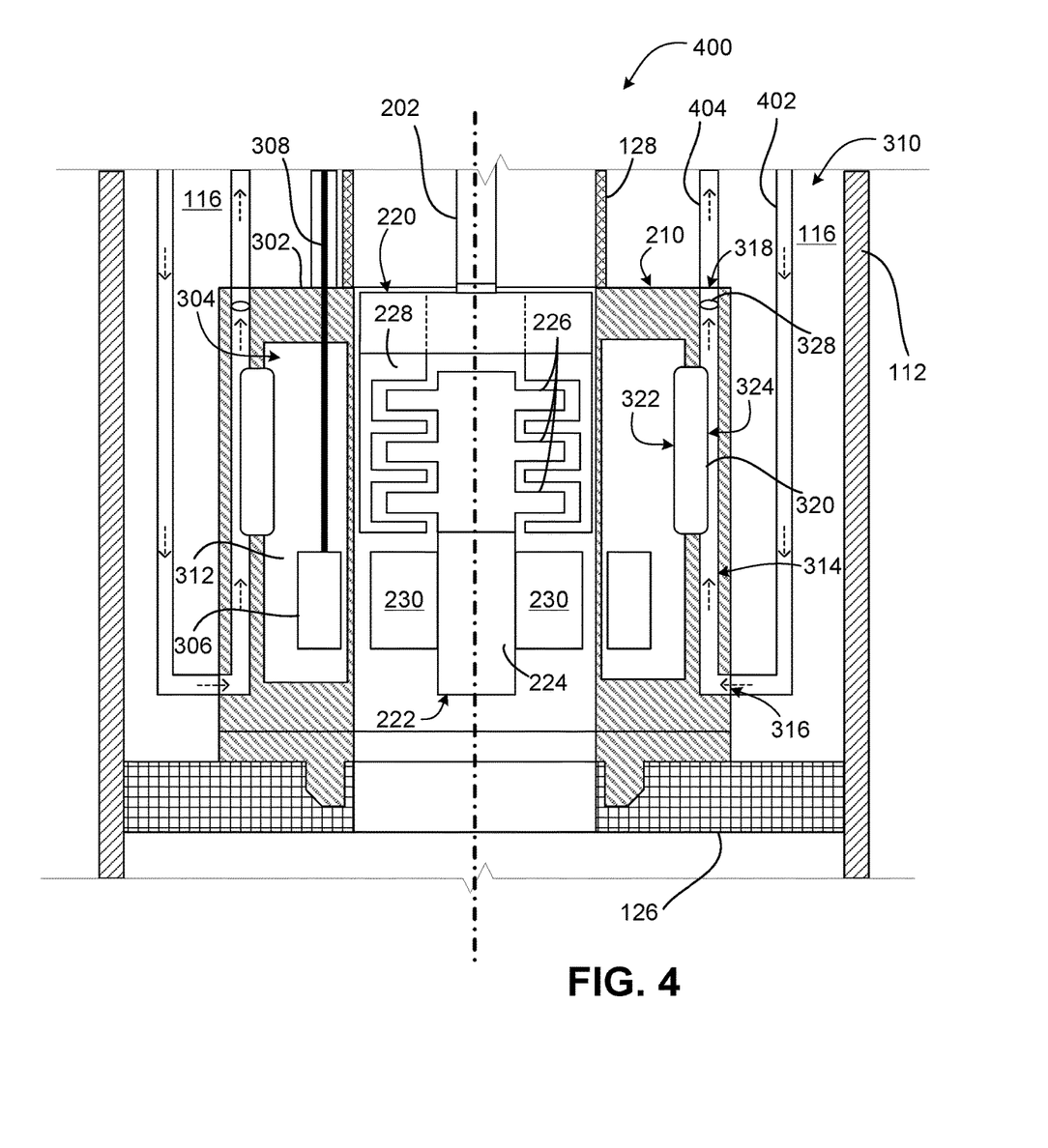
FIGS. 4 to 7 are schematic partial cross-sectional side views of example systems in the well of FIG. 2.

For example, FIG. 4 is a partial cross-sectional side view of an example artificial lift system 400. The example system 400 is the same as example system 200 of FIG. 3, except the example system 400 includes an inlet communication line 402 fluidly connected to the inlet 316 of the flow channel 314, and an outlet communication line 404 fluidly connected to the outlet 318 of the flow channel 314. The inlet communication line 402 supplies coolant fluid to the inlet 316 of the flow channel 314, and the outlet communication line 404 flows fluid from the outlet 318 away from the subsystem 210. The inlet communication line 402 and the outlet communication line 404 fluidly connect to a fluid supply located remotely from the system 400, such as at a topside surface of the well 100 (e.g., at the surface 106), and include a sealed tubing that extends from the stator housing 302 through the annulus 310 to the remote fluid supply. The coolant fluid can be provided from the topside of the well 100 or from a portion of the annulus uphole of the stator housing 302 (e.g., an uphole end of the annulus) through the inlet communication line 402, can flow through the flow channel 314, and can be provided back to the fluid supply (or a portion of the annulus) through the outlet communication line 404. The coolant circulating through the inlet communication line 402 and outlet communication line 404 can be pressurized, and can be circulated at a flow rate dependent on an operation of the stator 306. For example, at a higher operational speed of the rotor 222 and stator 306, the coolant can be circulated at a higher flow rate.

The type of coolant utilized in the system 400 can vary. Fluids that are non-corrosive can be suitable as coolants. A non-limiting example of a coolant that can be used include dielectric fluid, water, brine, water/glycol mixture, filtered or unfiltered production fluid, a combination of these fluids, or other fluid. In some implementations, the coolant can also serve as lubrication fluid.

The arrows in FIG. 4 (and in FIGS. 3 and 5-7) represent the flow direction of the coolant circulating through the communication lines and flow channel 314. The configuration of the communication lines and the flow channel 314, including the flow direction of the coolant, can be different from the example shown in FIG. 4. Although the inlet communication line 402 and outlet communication line 404 are shown as having separate connections in FIG. 4, in some implementations, the coolant can be supplied through an umbilical that houses both the inlet communication line 402 and the outlet communication line 404, and in some examples, also houses the electrical connection 308.

Figure 5:
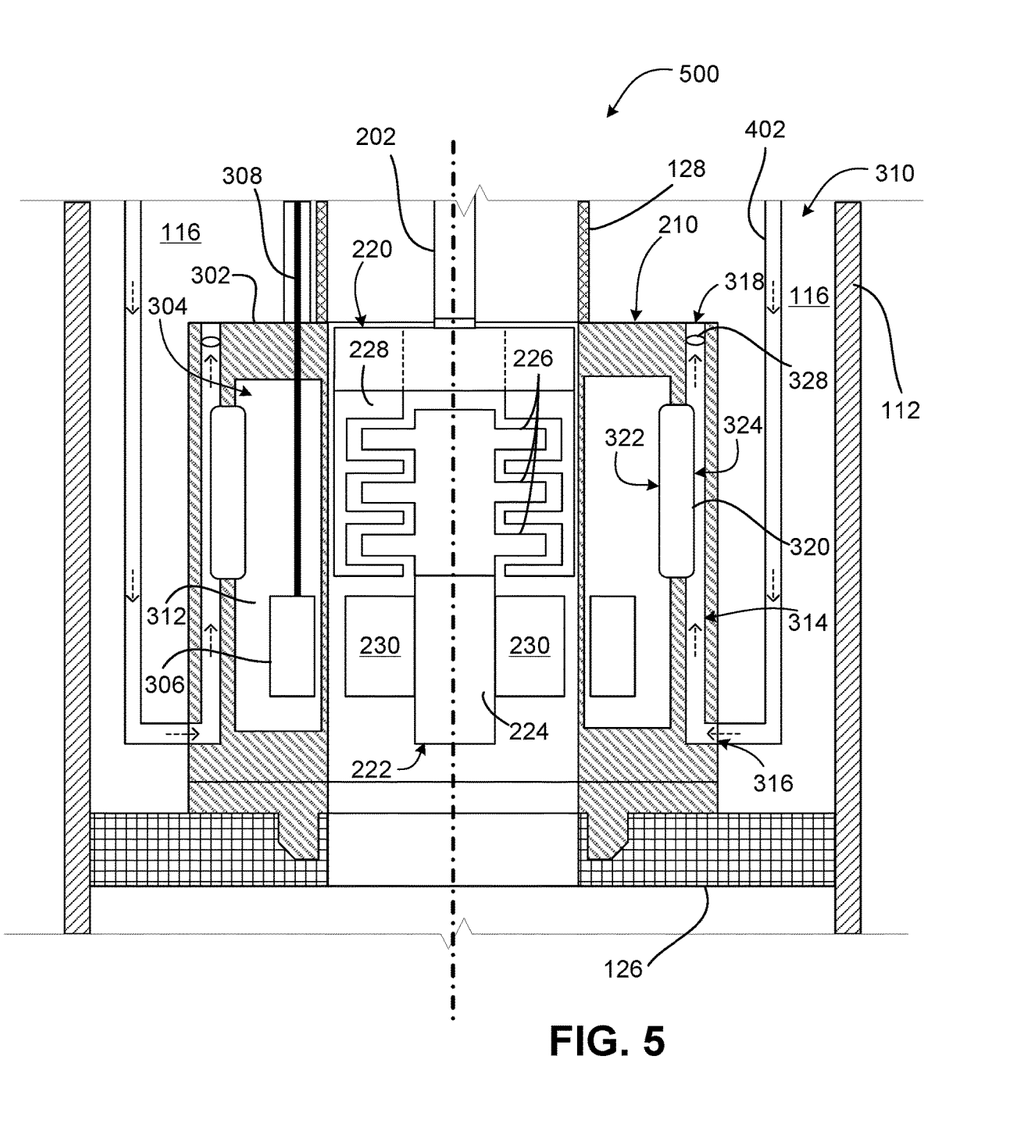

FIG. 5 is a partial cross-sectional side view of an example artificial lift system 500. The example system 500 is the same as example system 400 of FIG. 4, except the example system 500 excludes the outlet communication line 404 of FIG. 4. The inlet communication line 402 fluidly connects to the inlet 316 of the flow channel 314, and the outlet 318 fluidly connects to the annulus 310. The inlet communication line 402 supplies coolant fluid to the inlet 316 of the flow channel 314, and the outlet 318 outputs the fluid from the flow channel 314 to the annulus 310. In some implementations, the inlet communication line 402 provides cool annulus brine solution to the inlet 316 of the flow channel 314, where the cool annulus brine flows across the heat exchanger 320 toward the outlet 318, and the outlet 318 outputs warmed annulus brine solution to the annulus 310. In some implementations, the brine solution in the annulus 310 at the surface 106 of the well can be cooled, and pumped down the inlet communication line 402 to the flow channel 314.

Figure 6:
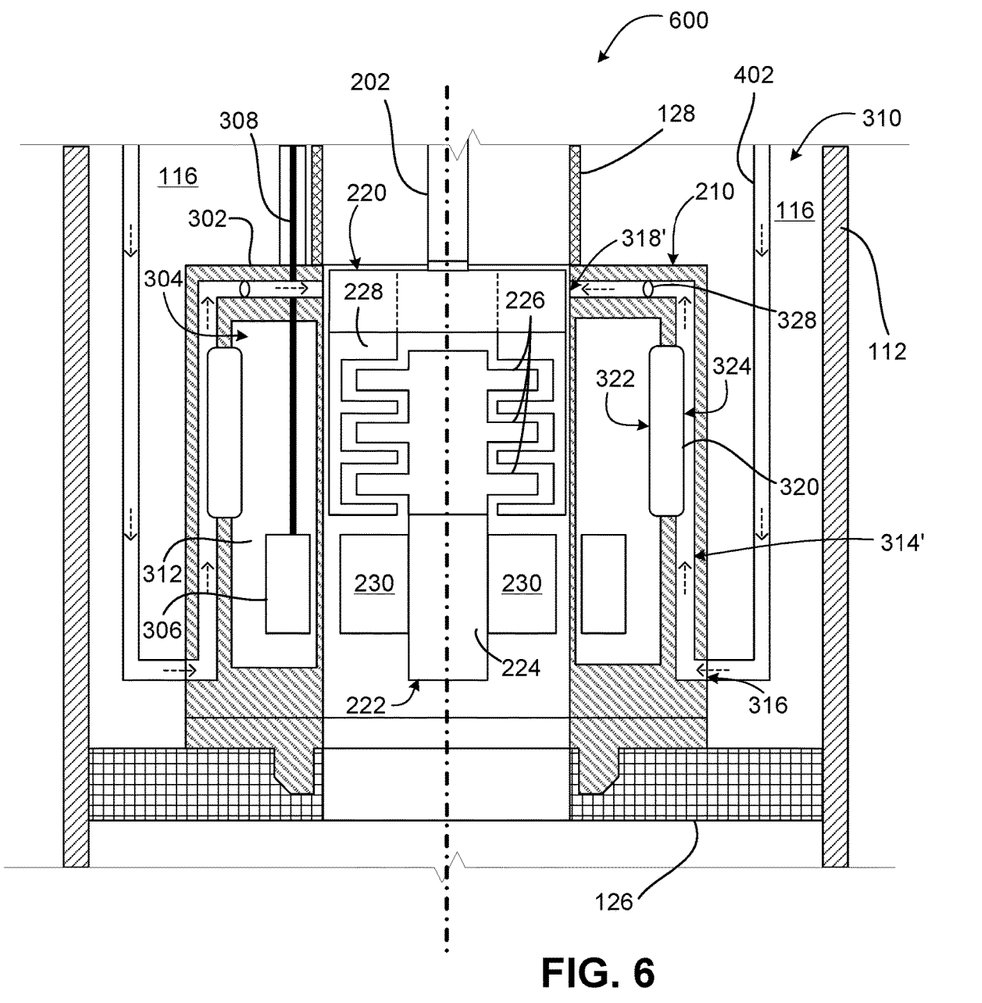

FIG. 6 is a partial cross-sectional side view of an example artificial lift system 600. The example lift system 600 is the same as example system 500 of FIG. 5, except the outlet 318' (like outlet 318 of FIGS. 3-5) of the flow channel 314' (like flow channel 314 of FIGS. 3-5) outputs to the central bore of the system 600. The inlet communication line 402 fluidly connects to the inlet 316 of the flow channel 314', and the outlet 318' fluidly connects to the central bore. The retrievable string 220 resides in the central bore to flow production fluids uphole through the production tubing 128, and the outlet 318' outputs fluid from the flow channel 314' into the central bore. The inlet communication line 402 pumps coolant fluid to the inlet 316 of the flow channel 314' to contact the heat exchanger 320, and the outlet 318' injects the heated coolant into the central bore, where production fluid flows. In some implementations, the injected coolant increases the water cut of the production fluid as it flows uphole through the production tubing 128, which can reduce the viscosity of the production fluid and allow better pumping characteristics for the removal of production fluid from the well 100. For example, the coolant fluid can include water, and the injected water from the outlet 318' of the flow channel 314' can increase the water cut of the production fluid. In some examples, the seal system 126 is excluded from the system 600, and the outlet 318' can output fluid from the flow channel 314' into either or both of the central bore or the annulus.

While FIG. 6 shows the inlet 316 of the flow channel 314 proximate to a downhole end of the housing 302 and the outlet 318' of the flow channel 314 proximate to an uphole end of the housing 302, the locations of the inlet 316 and the outlet 318' can be different, as described earlier. For example, the outlet 318' of the flow channel 314' can be positioned proximate to and/or downhole of the fluid inlet of the pump of the retrievable string 220. In some examples, the coolant fluid is injected from the flow channel 314' through the outlet 318' into the central bore, where the injected coolant can flow into the fluid inlet of the pump, across components of the motor (e.g., the rotor 222, the inner surface of the stator housing 302, or other), or both. As described earlier, the permanent magnet(s) 230 of the rotor 222 can be positioned uphole of or downhole of the impellers 226 (which form the pump), and the outlet 318' can inject coolant into the central bore downhole of the retrievable string 220, uphole of the retrievable string 220, between the permanent magnet motor portion of the rotor 222 and the pump, or elsewhere along a longitudinal length of the retrievable string 220. In some examples, the outlet 318' can inject coolant fluid at the inlet of the pump of the retrievable string 220, at the outlet of the pump of the retrievable string 220, elsewhere along the longitudinal length of the retrievable string 220, or a combination of these.

Figure 7:
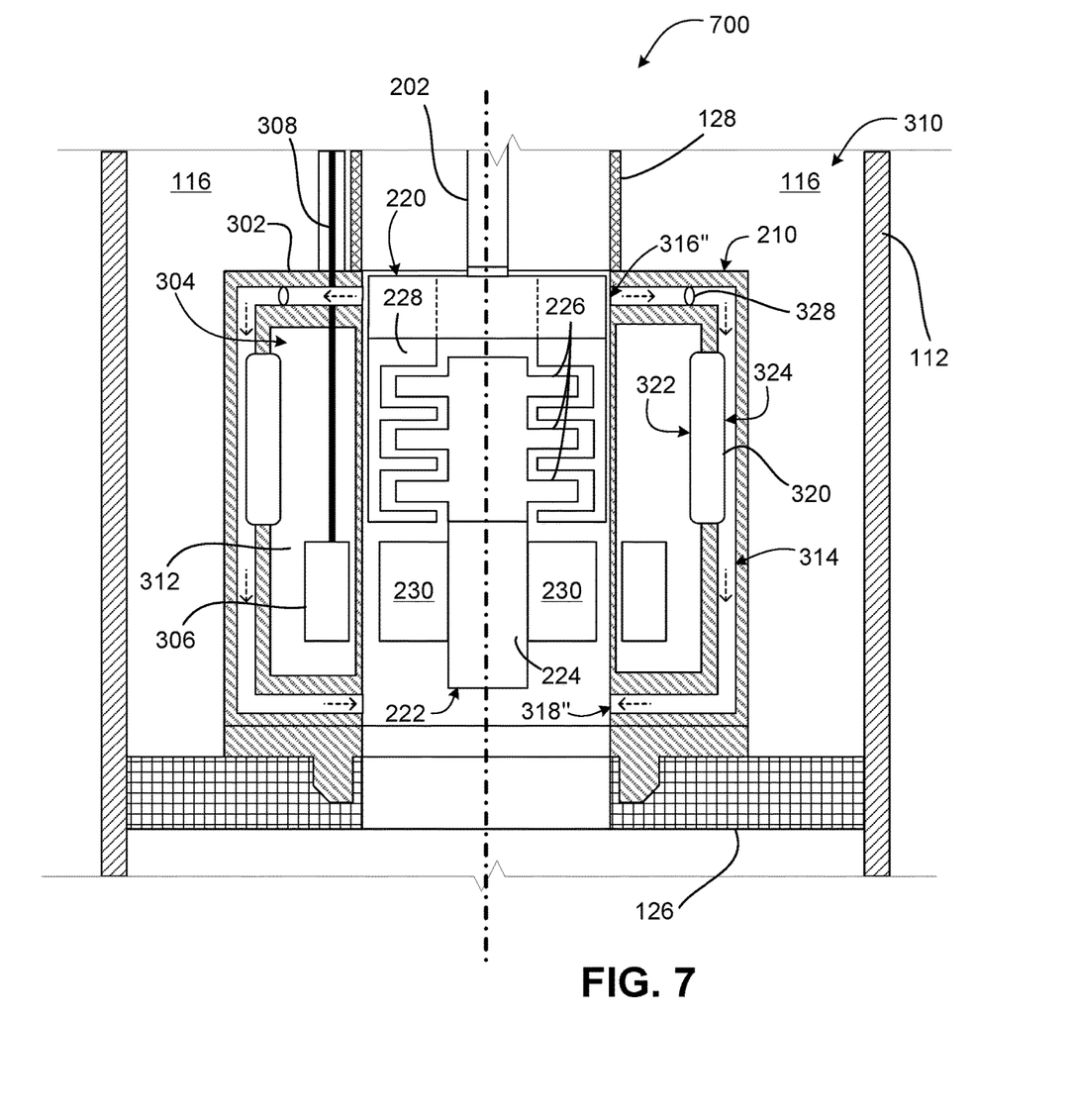

FIG. 7 is a partial cross-sectional side view of an example artificial lift system 700. The example lift system 700 is the same as example system 200 of FIG. 3, except the inlet 316" (like inlet 316 of FIGS. 3-6) and the outlet 318" (like outlet 318 of FIGS. 3-5 and 318' of FIG. 6) of the flow channel 314" (like flow channel 314 of FIGS. 3-5 and flow channel 314' of FIG. 6) are fluidly connected to the central bore to circulate production fluid from the central bore through the flow channel 314", the inlet 316" is positioned proximate to the uphole end of the housing 302, and the outlet 318" is positioned proximate to the downhole end of the housing 302. During operation of the system 700, the retrievable string 220 creates a pressure differential across the longitudinal ends of the rotor 222, where a higher pressure exists at the fluid outlet of the pump of the retrievable string 220 that is greater than a lower pressure at the fluid inlet of the pump of the retrievable string 220. The pressure drop drives the flow of fluid through the flow channel 314". The inlet 316" and the outlet 318" can be positioned on opposite sides of this pressure differential, such that the pressure differential promotes flow of the production fluid along the flow channel 314" from the inlet 316" to the outlet 318". In some implementations, the seal system 126 is excluded from the system 700, and the inlet 316", outlet 318", or both the inlet 316" and the outlet 318", fluidly connect to either or both of the central bore or the annulus. In some systems, the inlet can be positioned downhole of the pump of the retrievable string, while the outlet can be positioned at some mid or central point along the pump of the retrievable string where the flowing pressure of the production fluid is lower than the pump inlet pressure, thus creating flow from the inlet through the flow channel and to the outlet. This mid point for example could be a point after the permanent magnet on the rotor but before the pump inlet, thus utilizing the pressure drop that would occur along the motor length to provide the pressure differential needed for coolant flow. Other inlet and outlet positions not described that can function in the same manner can be also implemented to provide coolant flow.

Figure 8:
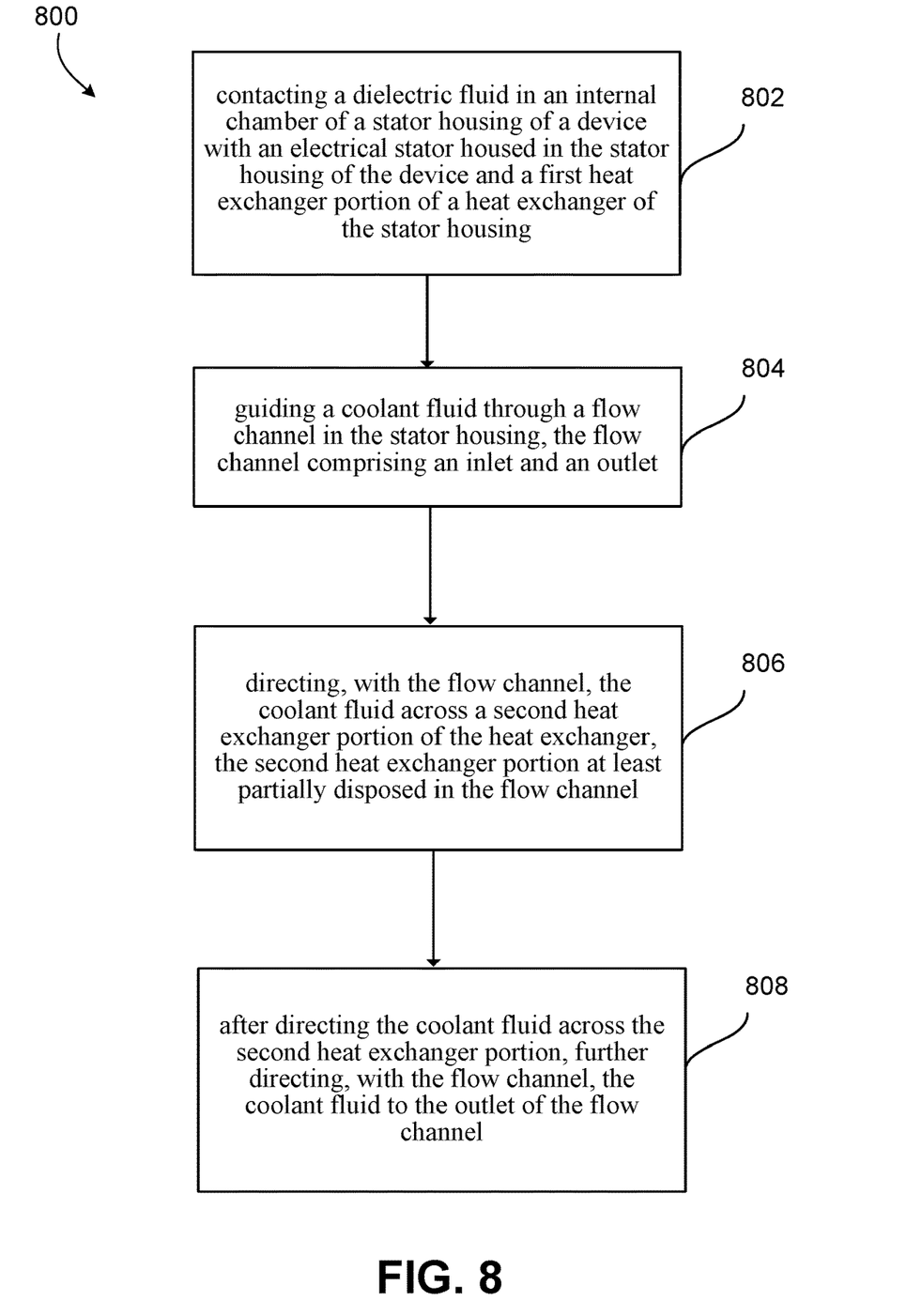
FIG. 8 is a flowchart describing an example method for cooling a stator element.

FIG. 8 is a flowchart describing an example method 800 for cooling a stator element, for example, performed by the example system 200, 300, 400, 500, 600, or 700 of FIGS. 2-7. At 802, dielectric fluid or thermally conductive potting or the stator construction itself (physically connected to or making up itself the heat exchanger/conductor) in an internal chamber of a stator housing of a device contacts an electrical stator housed in the stator housing and contacts a first heat exchanger portion of a heat exchanger of the stator housing. At 804, a flow channel in the stator housing guides a coolant fluid through the flow channel from an inlet to an outlet of the flow channel. At 806, the flow channel directs the coolant fluid across a second heat exchanger portion of the heat exchanger, where the second heat exchanger portion is at least partially disposed in the flow channel. At 808, after directing the coolant fluid across the second heat exchanger portion, the flow channel directs the coolant fluid to flow to the outlet of the flow channel.

While this disclosure contains many specific implementation details, these should not be construed as limitations on the scope of the subject matter or on the scope of what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method for cooling a stator element, the method comprising:
   contacting a dielectric fluid in an internal chamber of a stator housing of a device with:
     an electrical stator housed in the stator housing of the device, and
     a first heat exchanger portion of a heat exchanger of the stator housing, the device to be positioned downhole in a wellbore;
   guiding, with a flow channel in the stator housing, a coolant fluid through the flow channel, the flow channel comprising an inlet and an outlet that are fluidly connected to a flow bore of the device, wherein guiding the coolant fluid through the flow channel comprises guiding coolant fluid from the flow bore to the inlet proximate a longitudinally downhole end of the stator housing and through the flow channel;
   directing, with the flow channel, the coolant fluid across a second heat exchanger portion of the heat exchanger, the second heat exchanger portion at least partially disposed in the flow channel; and
   after directing the coolant fluid across the second heat exchanger portion, further directing, with the flow channel, the coolant fluid to the outlet of the flow channel proximate a longitudinally uphole end of the stator housing and further into the flow bore.

2. The method of claim 1, wherein the flow bore extends from a first, downhole longitudinal end of the device to a second, uphole longitudinal end of the device opposite the first, downhole longitudinal end.

3. The method of claim 2, wherein further directing the coolant fluid to the outlet of the flow channel comprises flowing the coolant fluid through the flow channel in a first direction toward the outlet with a control valve disposed within the flow channel.

4. The method of claim 1, wherein directing the coolant fluid across the second heat exchanger portion of the heat exchanger comprises flowing coolant fluid, with a circulation pump disposed at least partially within the flow channel, through the flow channel from the inlet to the outlet.

5. A well tool configured to operate downhole in a wellbore, the well tool comprising:
   an electrical stator, and
   a stator housing carrying dielectric fluid in contact with the stator, the stator housing comprising:
     an internal chamber, the dielectric fluid disposed in the internal chamber,
     a heat exchanger comprising:
       a first heat exchanger portion in contact with the dielectric fluid, and
       a second heat exchanger portion, and
     a flow channel having an inlet and an outlet, the inlet and the outlet being fluidly connected to a flow bore of the well tool, the flow bore extending from a first, downhole longitudinal end of the well tool to a second, uphole longitudinal end of the well tool opposite the first, downhole longitudinal end, where the inlet of the flow channel is disposed at a longitudinally downhole end of the stator housing and the outlet of the flow channel is disposed at a longitudinally uphole end of the stator housing, and the second heat exchanger portion at least partially disposed in the flow channel, the flow channel configured to flow coolant fluid along the second heat exchanger portion to transmit heat across the heat exchanger from the dielectric fluid to the coolant fluid.

6. The well tool of claim 5, comprising a communication line connected to the inlet of the flow channel and extending from an uphole end of the wellbore to the inlet, the communication line configured to flow the coolant fluid from the uphole end to the inlet.

7. The well tool of claim 5, wherein the flow bore extends from a first, downhole longitudinal end of the well tool to a second, uphole longitudinal end of the well tool opposite the first, downhole longitudinal end.

8. The well tool of claim 7, wherein the flow channel comprises a control valve proximate to the outlet of the flow channel, the control valve configured to selectively control flow direction of the coolant fluid between the outlet and the flow bore of the well tool.

9. The well tool of claim 5, further comprising a circulation pump disposed at least partially within the flow channel between the inlet and the outlet, the circulation pump configured to provide flow of the coolant fluid from the inlet toward the outlet.

10. The well tool of claim 5, wherein the internal chamber of the stator housing is hermetically sealed from the flow channel.

11. The well tool of claim 5, wherein the coolant fluid comprises a brine solution.

12. A stator assembly for a downhole-type well tool, the stator assembly comprising:
   a stator housing comprising an internal chamber;
   an electrical stator disposed within the stator housing and in contact with a heat exchanger, the electrical stator configured to drive a rotor;
   a flow channel in the stator housing comprising an inlet and an outlet, the inlet and the outlet being fluidly connected to a flow bore of the well tool, the flow bore extending from a first, downhole longitudinal end of the well tool to a second, uphole longitudinal end of the well tool opposite the first, downhole longitudinal end, where the inlet of the flow channel is disposed at a longitudinally downhole end of the stator housing and the outlet of the flow channel is disposed at a longitudinally uphole end of the stator housing; and
   a heat exchanger having a first heat exchanger portion in contact with the electric stator in the internal chamber and a second heat exchanger portion at least partially disposed in the flow channel, the flow channel configured to flow coolant fluid along the second heat exchanger portion to transmit heat across the heat exchanger from the electric stator to the coolant fluid.

* * * * *